US011372235B2

(12) United States Patent
Pascall et al.

(10) Patent No.: US 11,372,235 B2
(45) Date of Patent: Jun. 28, 2022

(54) DEFORMABLE MIRROR WITH INTEGRATED MICROCHANNEL SUPPORT

(71) Applicant: LAWRENCE LIVERMORE NATIONAL SECURITY, LLC, Livermore, CA (US)

(72) Inventors: Andrew J. Pascall, Livermore, CA (US); Kerry G. Krauter, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 416 days.

(21) Appl. No.: 16/522,261

(22) Filed: Jul. 25, 2019

(65) Prior Publication Data

US 2021/0026132 A1  Jan. 28, 2021

(51) Int. Cl.
 *G02B 26/08* (2006.01)
 *B33Y 80/00* (2015.01)
 *B33Y 10/00* (2015.01)

(52) U.S. Cl.
 CPC .......... *G02B 26/0858* (2013.01); *B33Y 10/00* (2014.12); *B33Y 80/00* (2014.12)

(58) Field of Classification Search
 None
 See application file for complete search history.

(56) References Cited

U.S. PATENT DOCUMENTS

| 5,986,795 | A | 11/1999 | Chapman et al. |
| 6,278,764 | B1 | 8/2001 | Barbee, Jr. et al. |
| 6,724,517 | B2 | 4/2004 | Bär et al. |
| 6,764,187 | B2 | 7/2004 | Ryutov et al. |
| 7,264,363 | B2 | 9/2007 | Griffith et al. |
| 9,492,969 | B2 | 11/2016 | Spadaccini et al. |
| 2004/0017620 | A1* | 1/2004 | Kaneko ................. G02B 7/02 359/823 |
| 2015/0056415 | A1 | 2/2015 | Southard |
| 2017/0184841 | A1* | 6/2017 | Ding ................... B60R 1/00 |
| 2021/0026132 | A1* | 1/2021 | Pascall ................ B33Y 80/00 |

FOREIGN PATENT DOCUMENTS

EP  2840071 A1  2/2015

OTHER PUBLICATIONS

Bathurst, "Ink Jet Printing of PZT Thin Films for MEMS." Thesis, Massachusetts Institute of Technology, 2012, pp. 1-113.
Hertzog et al.,"Optical fabrication of lighweighted 3D printed mirrors," Proc. of SPIE, vol. 9573, 2015, 957308-1 to 957308-15.
Vdovin et al, "Agile beams and Micromachines membrane deformable mirrors," IEEE, pp. 576-577.

* cited by examiner

*Primary Examiner* — Jennifer D. Carruth
(74) *Attorney, Agent, or Firm* — Eddie E. Scott

(57) ABSTRACT

A deformable mirror has a mirror front face and a mirror back exposed surface. An elastomeric support structure is connected to the mirror back exposed surface. The elastomeric support structure includes a multitude of microchannels wherein the microchannels have a closed end located proximate the mirror back exposed surface and an open end located away from the mirror back exposed surface. A fluid pressure source is connected to the open end of the microchannels. A power source and control system are connected to the fluid pressure source.

13 Claims, 6 Drawing Sheets

DEFORMABLE MIRROR WITH INTEGRATED MICROCHANNEL SUPPORT

STATEMENT AS TO RIGHTS TO APPLICATIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to deformable mirrors and more particularly to a deformable mirror with integrated microchannel support.

State of Technology

This section provides background information related to the present disclosure which is not necessarily prior art.

Deformable mirrors are used in the field of optics to shape images in order to correct the aberrations and to improve the quality. Current technologies use electromagnetic push-pull actuators at selected points on the mirror to distort the reflecting surface into a desired shape, such that the output image is superior in some way to the input image. The current state of art deformable mirror systems are bulky. They have a low number of actuation elements. They also have slow response times. Problems with existing deformable mirror technology include (1) not enough push-pull points for high spatial frequency correction and (2) low dynamic response of the mirror itself for higher frequency temporal correction.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventors' apparatus, systems, and methods solve the problem of generating lightweight, high speed deformable mirrors for adaptive optics applications. Current deformable mirror systems are bulky, have a low number of actuation elements, and have slow response times.

The inventors' apparatus, systems, and methods use additive manufacturing to build a support structure onto the back side of a thin film mirror. By utilizing a combination of MEMS/optical coating processes and additive manufacturing to the inventors have created a lightweight deformable mirror and support.

The inventors' apparatus, systems, and methods provide a deformable mirror that has a mirror front face and a mirror back exposed surface. An elastomeric support structure is connected to the mirror back exposed surface. The elastomeric support structure includes a multitude of microchannels wherein the microchannels have a closed end located proximate the mirror back exposed surface and an open end located away from the mirror back exposed surface. A fluid pressure source is connected to the open end of the microchannels. A power source and control system are connected to the fluid pressure source.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
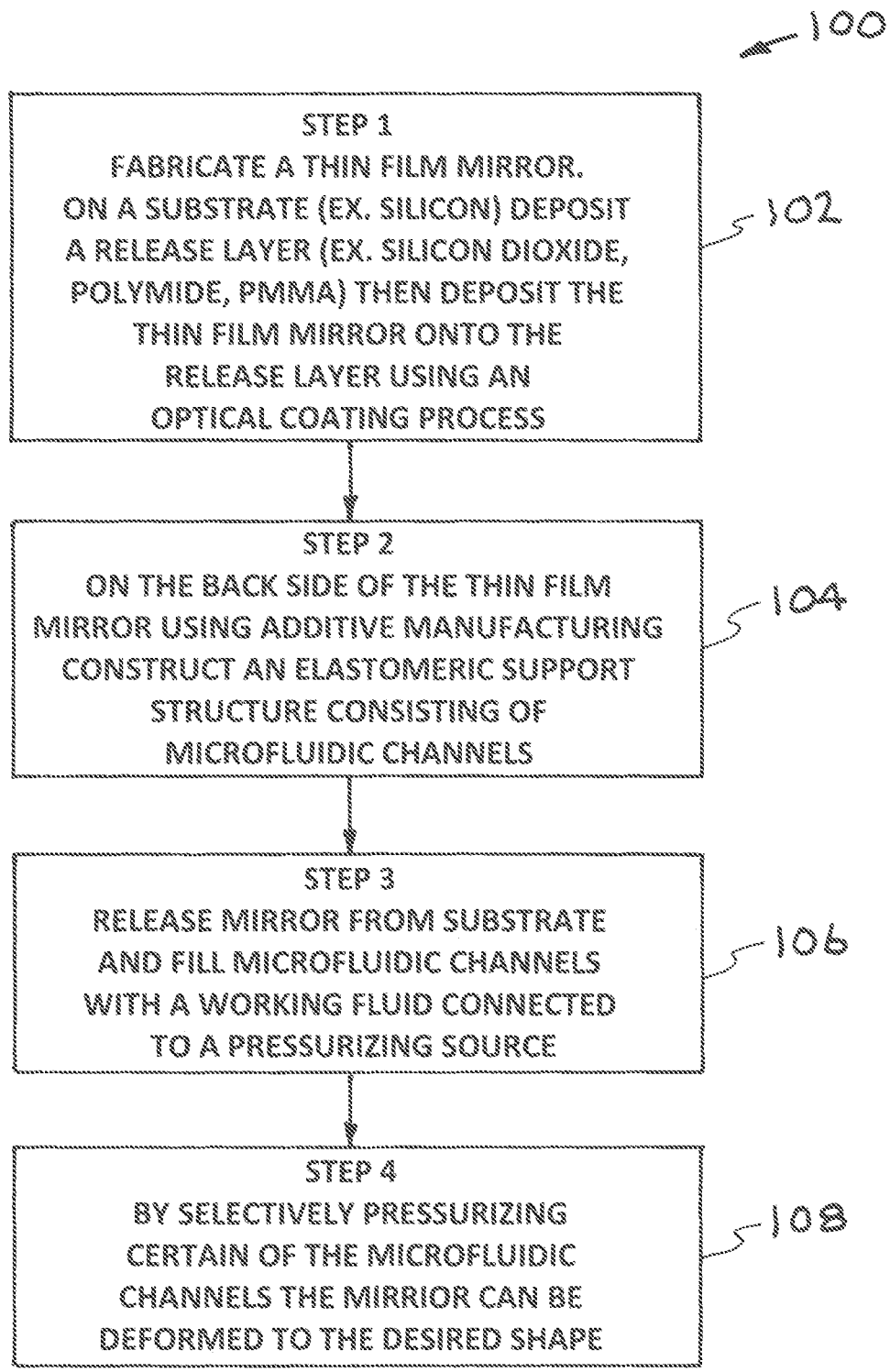
FIG. 1 is a flow chart that visually illustrates steps utilized in producing and operating the inventors' deformable mirror with integrated microchannel support.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

The inventors' apparatus, systems, and methods provide a deformable thin film mirror which is attached to a lightweight flexible support structure containing a series of discrete microchannels that are individually addressable with a pressure source. When the working fluid in a particular microchannel is pressurized, it locally deforms the thin film mirror in the vicinity of the microchannel. This pressure source can be actuated at high speed and accuracy leading to subnanometer to 100s of micrometer level displacements at high repetition rates. This invention can be used in adaptive optics applications and is lighter weight and higher performance that current adaptive optics.

Referring now to the drawings, and in particular to FIGS. 1 thru 9, a flow chart and illustrative schematic figures describe and illustrate the inventors' apparatus, systems, and methods that provide a deformable thin film mirror attached to a lightweight flexible support structure containing a series of discrete microchannels that are individually addressable with a pressure source. The inventors' apparatus, systems, and methods utilize a combination of traditional MEMS/optical coating processes and additive manufacturing to realize a lightweight deformable mirror and support.

1. The thin mirror is fabricated using traditional optical coating techniques on a suitable substrate, such as a silicon wafer. A key feature is the release layer between the substrate and the mirror. The release layer can be any material that is can be removed cleanly without damaging the thin film mirror with a chemical etch or thermal process. Release layers include silicon dioxide, polyimide, PMMA, etc. Additionally, the release layer may be the substrate itself. The front face of the mirror is in contact with the release layer during fabrication.

2. A mirror support structure can then be manufactured on the exposed back surface of the mirror backing. Preferably, this is manufactured with an additive manufacturing technique such as stereolithography or 2 photon lithography. The support structure contains a series of microchannels embedded in it. The channels or groups of channels are individually addressable. The channels terminate in the vicinity of the mirror backing and are connected to a pressure source through the other side of the structure. The support structure may be constructed out of a rigid, semi-flexible, or flexible material.

3. The microchannels are charged with a working fluid, such as air, nitrogen, water, ionic liquid, liquid metal, or magnetorheologic fluid. The mirror is released from the substrate 4. If the support structure is rigid or semiflexible, and the deformable mirror is held to a specific contour by the unpressurized support structure alone, then by individually pressurizing the working fluid in certain microchannels, the mirror will locally deform in those areas proximal to said microchannels. If the support structure is flexible, and the thin film mirror is not held to a specific contour by the support structure, then all the microchannels are pressurized to a level to support a specific mirror contour. Then, the pressure in individual microchannels can be changed to locally control the contour proximal to the microchannels. For example, by increasing the pressure in the microchannels above atmospheric pressure, the surface of the mirror is deformed to be convex in nature. By decreasing the pressure in the channel below atmospheric pressure, the mirror can be deformed to be concave in nature.

Referring now to FIG. 1, a flow chart visually illustrates steps utilized in producing and operating the inventors' deformable mirror with integrated microchannel support. The inventor's apparatus, systems, and methods are generally designated by the reference numeral 100.

The inventor's apparatus, systems, and methods uses additive manufacturing to make a 3D hollow strut system for the mirror support structure. The structure can have many contact points on the mirror, which act as the push-pull points to deform the mirror. The more such points on the mirror, the higher the spatial frequency correction. This hollow strut support system is designed such that by putting fluid in the hollow struts and pressuring it, the strut exerts the push-pull force on the mirror to deform it in a desired fashion. Using temporal control of the pressure (via microchannels) applied to the individual struts at contact points the mirror, then the mirror can be dynamically deformed. Thus, the inventors claim both improved spatial frequency resolution and higher frequency dynamic response than existing systems. The support structure can be additively manufactured either by projection microstereolithography (PµSL) or two-photon lithography (TPP).

The steps of the inventor's apparatus, systems, and methods 100 illustrated in FIG. 1 are identified and described below.

Reference Numeral 102—Fabricate a thin film mirror on substrate, deposing a release layer, then deposit the thin film mirror onto the released layer using an optical coating process;

Reference Numeral 104—On the back side of the thin film mirror using additive manufacturing construct an elastomeric support structure consisting of microfluidic channels;

Reference Numeral 106—Release mirror from substrate and fill microfluidic channels with a working fluid connected to a pressuring source;

Reference Numeral 108—By selectively pressuring certain of the microfluidic channels the mirror can be deformed to the desired shape.

Figure 2:
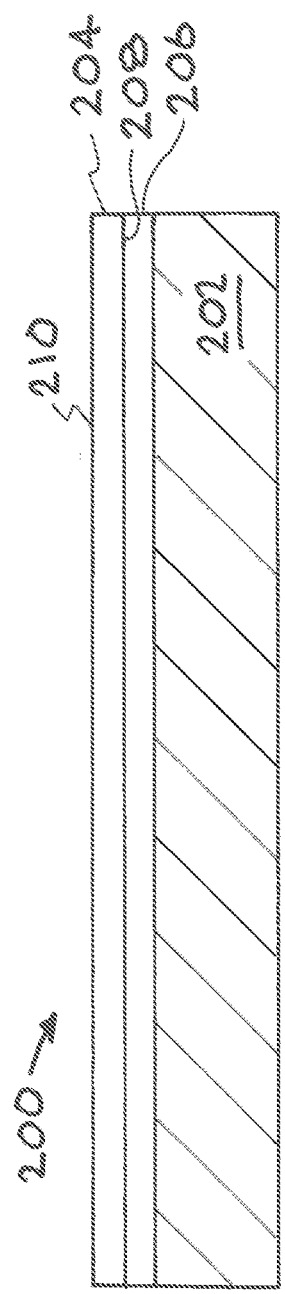
FIG. 2 is a simplified schematic depiction that illustrates the structural components of the inventor's apparatus, systems, and methods corresponding to step 1 of the flow chart.

Referring now to FIG. 2, a simplified schematic depictions illustrates the structural components of the inventor's apparatus, systems, and methods corresponding to step 1 (Reference numeral 102) of FIG. 1. Step 1 (Reference numeral 102) of FIG. 1 is the fabrication of a thin mirror. The structural components in the fabrication of the thin mirror are collectively designated by the reference numeral 200. As illustrated, the structural components 200 are made up of a number of individual components. The individual components are identified and described below.

Reference Numeral 202—Substrate,
 Reference Numeral 204—Thin mirror,
 Reference Numeral 206—Release layer,
 Reference Numeral 208—Front face of mirror, and
 Reference Numeral 210—Exposed back surface of mirror.

The identification and description of the collectively designated components 200 illustrated in FIG. 2 having been completed, the operation and additional description of the inventor's apparatus, systems, and methods will now be considered in greater detail. A thin mirror 204 is fabricated using traditional optical coating techniques on a suitable substrate 202, such as a silicon wafer. A release layer 206 is located between the substrate 202 and the mirror 204. The release layer 206 can be any material that can be removed cleanly without damaging the thin film mirror 204. The release layer 206 can include silicon dioxide, polyimide, PMMA, etc. Additionally, the release layer 206 may be the substrate 202 itself or include the substrate 202. The front face 208 of the mirror 204 is in contact with the release layer 206 during fabrication. The fabrication of the thin mirror provides an exposed back surface 210 of the mirror which in used in subsequent processing.

The release layer 206 is only used during fabrication of the mirror and the release layer 206 is subsequently removed exposing the front face 208 of mirror. The other side of the mirror 202 is the exposed back surface 210 of the mirror that used in producing additional components of the inventor's apparatus, systems, and methods.

Figure 3:
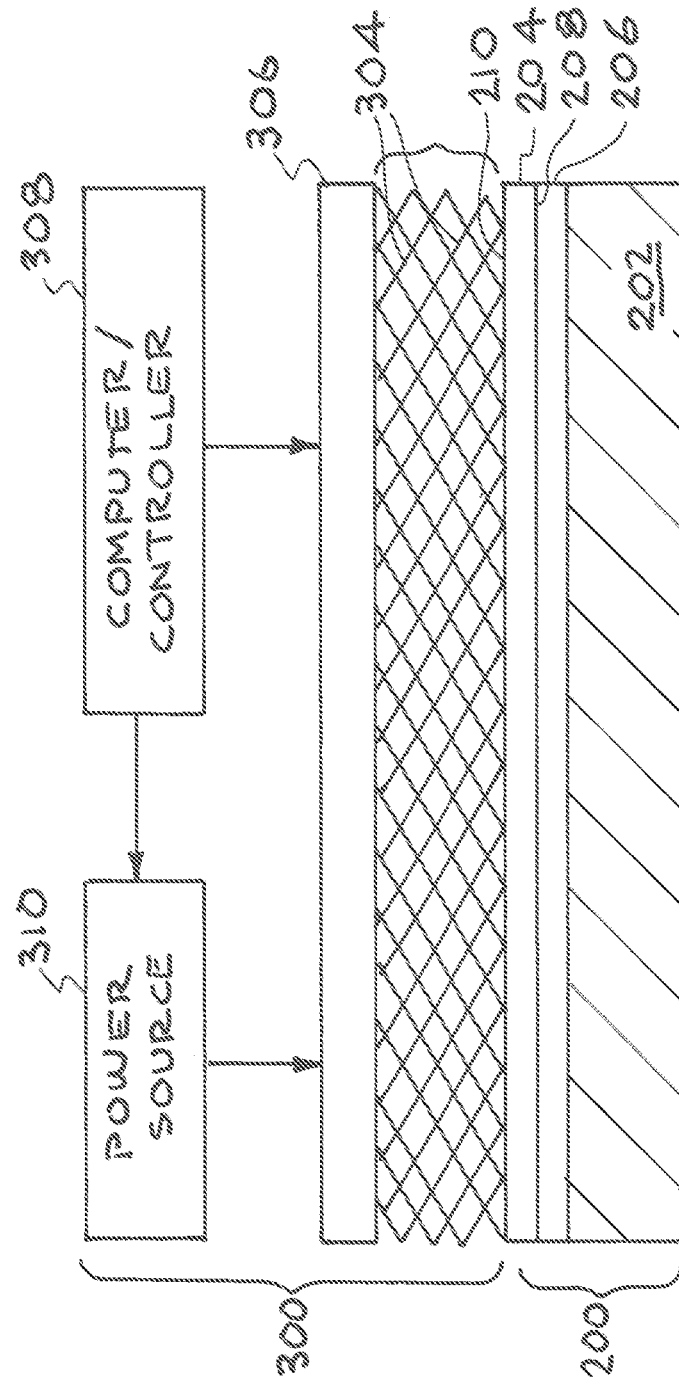
FIG. 3 is a simplified schematic depiction that illustrates the structural components of the inventor's apparatus, systems, and methods corresponding to step 2 of the flow chart.

Referring now to FIG. 3, a simplified schematic depictions illustrates the structural components of the inventor's apparatus, systems, and methods corresponding to step 2 of FIG. 1. Step 2 of FIG. 1 is the manufacture of a mirror support structure on the exposed back surface 210 of the mirror 204. The structural components in the manufacture of a mirror support structure are collectively designated by the reference numeral 300. As illustrated, the structural components 300 are made up of a number of individual components. The individual components are identified and described below.

Reference Numeral 302—Elastomeric support structure,
Reference Numeral 304—Microchannels,
Reference Numeral 306—Fluid pressure source,
Reference Numeral 308—Computer controller, and
Reference Numeral 310—Power source.

The identification and description of the collectively designated components 300 illustrated in FIG. 3 having been completed, the operation and additional description of the inventor's apparatus, systems, and methods will now be considered in greater detail. The mirror support structure is manufactured on the exposed back surface 210 of the mirror 204. For example, this is manufactured with an additive manufacturing technique such as stereolithography or 2 photon lithography.

An elastomeric support structure 302 is additively manufactured on the exposed back surface 210 of the mirror 204. The elastomeric support structure 302 contains a series of microchannels 304 embedded in it. The channels 304 are individually addressable. The channels 304 terminate in the vicinity of the mirror 204 and are connected to the fluid pressure source 306. The computer controller 308 and the power source 310 control the operation of the inventors' deformable thin film mirror apparatus, systems, and methods.

Figure 4:
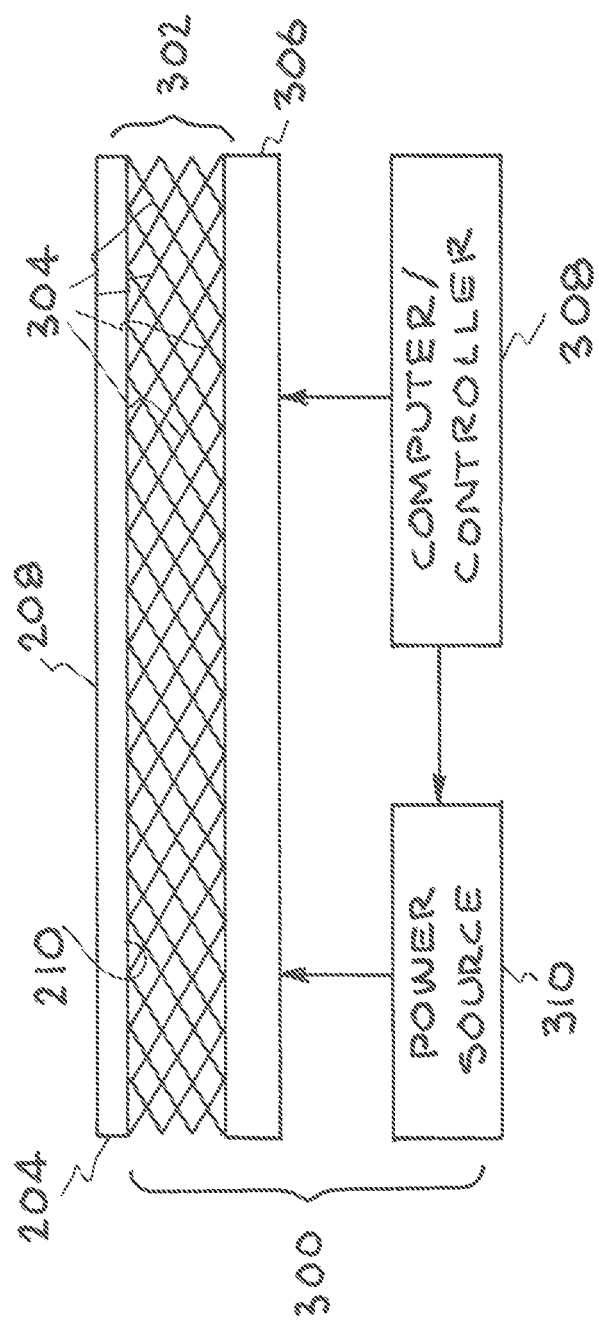
FIG. 4 is a simplified schematic depiction that illustrates the structural components of the inventor's apparatus, systems, and methods corresponding to step 3 of the flow chart.

Referring now to FIG. 4, a simplified schematic depictions illustrates the inventor's apparatus, systems, and methods corresponding to step 3 of FIG. 1. Step 3 of FIG. 1 is the step of releasing the mirror from the substrate and filling the microfluidic channels with a working fluid connected to the fluid pressuring source.

Note that FIG. 4 shows the mirror 204 and the structural components 300 in a different position than that shown in FIG. 3. The mirror 204 and the structural components 300 have been turned over in FIG. 4 to better illustrate the inventor's apparatus, systems, and methods in the remaining figures.

The release layer 206 that was located between the substrate 202 and the mirror 204 (shown in FIG. 3) has been removed. This leaves the mirror 204 and the structural components 300 in operational position for the inventor's deformable mirror with integrated microchannel support apparatus, systems, and methods. The front face 208 of mirror 204 is in operational position for the inventor's deformable mirror. The structural components 300 provide actuation of the inventor's deformable mirror 204. The structural components 300 include a number of individual components identified and described below.

Reference Numeral 302—Elastomeric support structure,
Reference Numeral 304—Microchannels,
Reference Numeral 306—Fluid pressure source,
Reference Numeral 308—Computer controller, and
Reference Numeral 310—Power source.

The collectively designated components 300 illustrated in FIG. 4 having been completed, the operation and additional description of the inventor's apparatus, systems, and methods will now be considered in greater detail. The structural components 300 are produced on the exposed back surface 210 of the mirror 204. For example, the structural components 300 can be produced with an additive manufacturing technique such as stereolithography or 2 photon lithography.

The elastomeric support structure 302 is additively manufactured on the exposed back surface 210 of the mirror 204. The elastomeric support structure 302 contains a series of microchannels 304. The microchannels 304 are individually addressable. The microchannels 304 terminate in the vicinity of the mirror 204 and are connected to the fluid pressure source 306. The computer controller 308 and the power source 310 control the operation of the inventors' deformable thin film mirror apparatus, systems, and methods.

Figure 5:
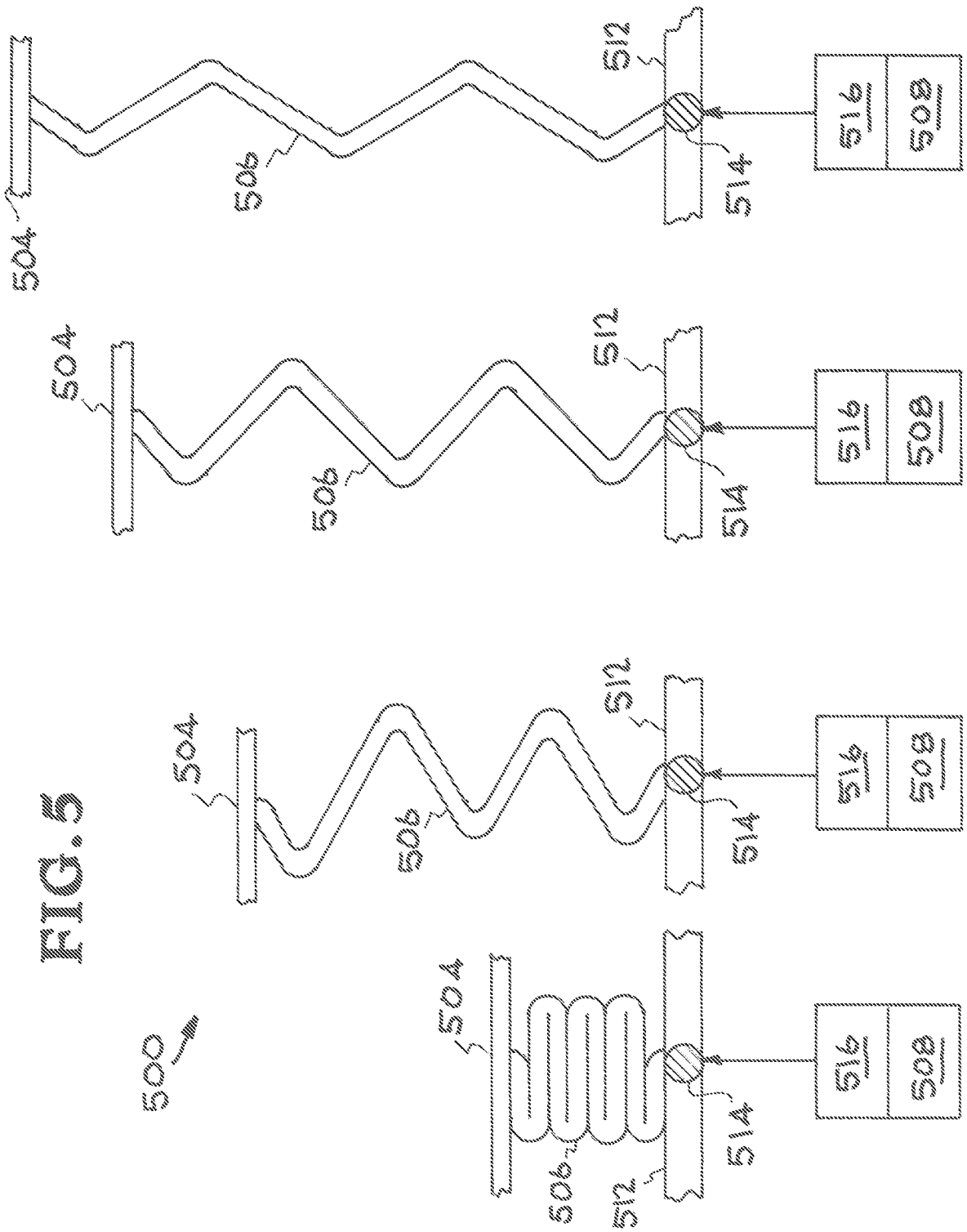
FIG. 5 is a simplified schematic depiction that illustrate an embodiment of the inventor's apparatus, systems, and methods.

Referring now to FIG. 5 a simplified schematic depictions illustrate an embodiment of the inventor's apparatus, systems, and methods. This embodiment is designated generally by the reference numeral 500. The mirror 504 is in operational position for actuation of the inventor's deformable mirror. The elastomeric support structure contains a series of microchannels that are individually addressable. One of the microchannel 506 is illustrated in FIG. 5. It is to be understood that the embodiment 500 of the inventor's apparatus, systems, and methods includes a multitude of individual microchannels identical to microchannel 506.

The microchannel 506 has a closed end located proximate the mirror back exposed surface and an open end located away from the mirror back exposed surface. The closed end of the microchannel 506 terminates in the vicinity of the mirror 504. The open end of the microchannel 506 is connected to a fluid pressure source 512 and a piezoelectric crystal 514. The computer controller 508 and the power source 510 are connected to the piezoelectric crystal 514. The piezoelectric crystal 514 expands to increase the fluid pressure in the microchannel and control the operation of the inventors' deformable thin film mirror apparatus, systems, and methods.

Referring again to FIG. 5A the embodiment 500 of the inventor's apparatus, systems, and methods is shown being activated. FIG. 5 shows the microchannel 506 in four different positions. The fluid 512 in the microchannel 506 undergoes an increase in pressure causing the microchannel 506 to move to an expanded position. The second, third, and fourth positions of the microchannel 506 demonstrate that the microchannel 506 has moved to its expanded position.

The piezoelectric crystal 514 is activated by the computer controller 508 and the power source 510. The fluid 512 in the microchannel 506 undergoes an increase in pressure causing the microchannel 506 to move to an expanded position. The embodiment 500 of the inventor's apparatus, systems, and methods includes a multitude of individual microchannels identical to microchannel 506. The pressure in individual microchannels can be changed to locally control the contour proximal to the microchannels.

Figure 6:
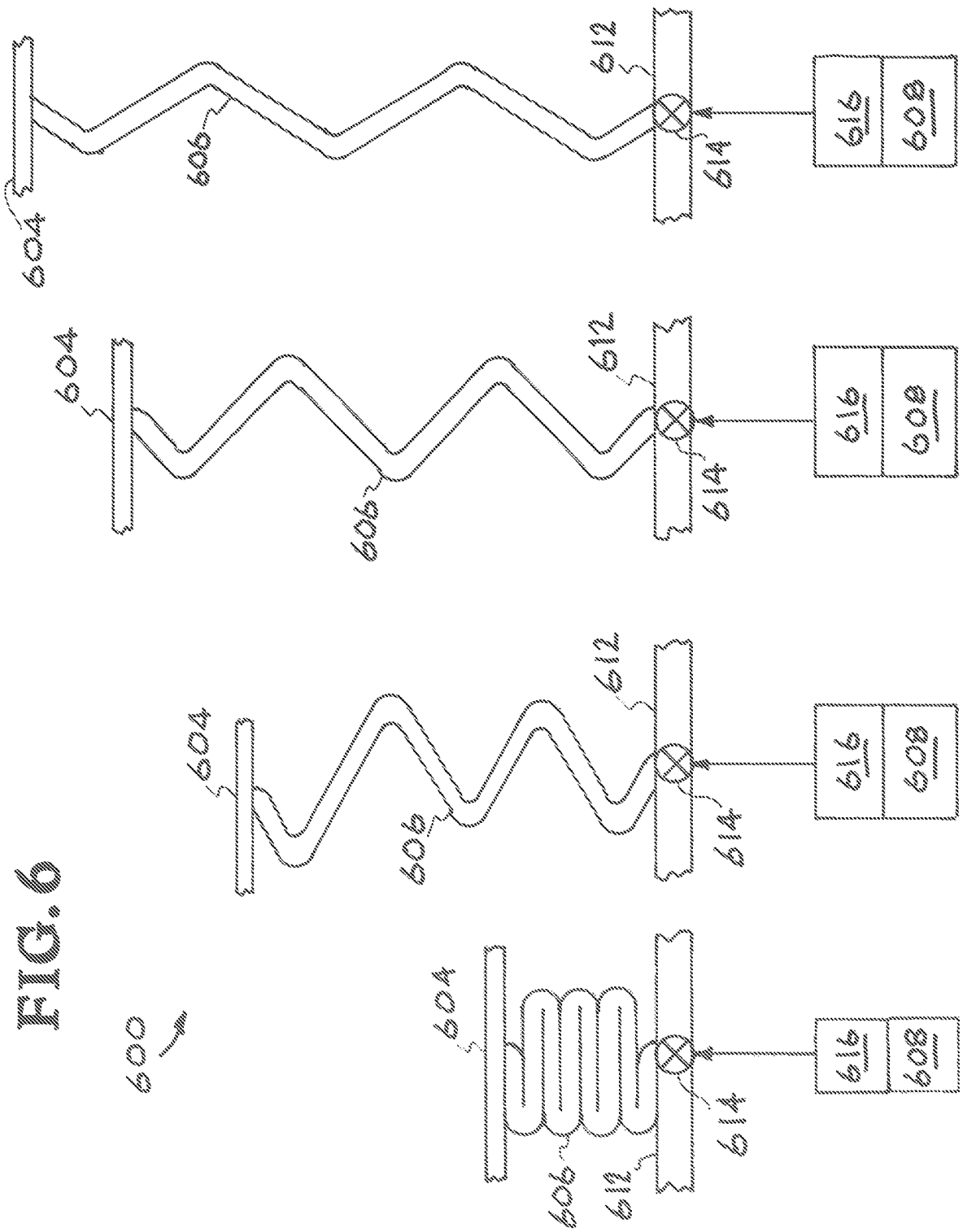
FIG. 6 is a simplified schematic depiction that illustrate another embodiment of the inventor's apparatus, systems, and methods.

Referring now to FIG. 6, a simplified schematic depiction illustrates another embodiment of the inventor's apparatus, systems, and methods. This embodiment is designated generally by the reference numeral 600. The mirror 604 is in operational position for actuation of the inventor's deformable mirror. The elastomeric support structure contains a series of microchannels that are individually addressable. One of the microchannel 606 is illustrated in FIG. 6.

The microchannel 606 terminates in the vicinity of the mirror 604. The microchannel 606 is connected to the fluid pressure source 616 through valve 614. The computer controller 608 and fluid pressure source 616 control the operation of the inventors' deformable thin film mirror apparatus, systems, and methods through the valve 614.

FIG. 6 shows the microchannel 606 in four different positions. The fluid 612 in the microchannel 606 undergoes an increase in pressure causing the microchannel 606 to move to an expanded position. The second, third, and fourth positions of the microchannel 606 demonstrate that the microchannel 606 has moved to its expanded position. The microchannel 606 terminates in the vicinity of the mirror 604 and the expansion of the microchannel 606 produce movement of the portion of the mirror 604 in the vicinity of the microchannel 606. The embodiment 600 of the inventor's apparatus, systems, and methods includes a multitude of individual microchannels identical to microchannel 606. The pressure in individual microchannels can be changed to locally control the contour proximal to the microchannels.

Figure 7:
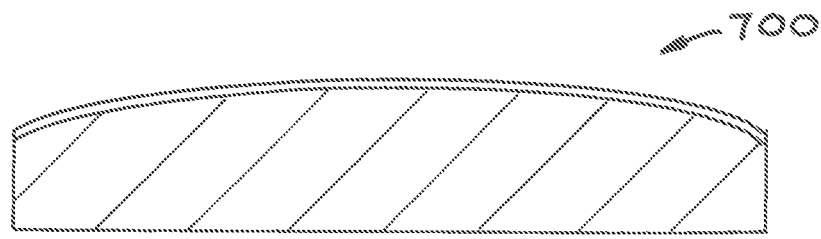
FIG. 7 is a simplified schematic depiction that illustrates the structural components of the inventor's apparatus, systems, and methods corresponding to step 4 of the flow chart.

Referring now to FIG. 7, a simplified schematic depiction illustrates an embodiment of a mirror of the inventor's apparatus, systems, and methods. This mirror embodiment is designated generally by the reference numeral 700. FIG. 7 depicts the inventor's apparatus, systems, and methods corresponding to step 4 of FIG. 1. Step 4 of FIG. 1 is the step of selectively pressuring certain of the microfluidic channels so that the mirror can be deformed to a desired shape.

The mirror embodiment 700 has been produce by the inventor's apparatus, systems, and methods shown in FIGS. 1-6. The mirror embodiment 700 has a convex shape that has been produced by actuation of the inventor's deformable mirror. The series of microchannels are individually addressable. A multitude of individual microchannels terminates in the vicinity of the mirror 700. The microchannels produce movement of the portion of the mirror 700 to produce the convex shape.

Figure 8:
FIG. 8 is a simplified schematic depiction that illustrates the structural components of another embodiment of the inventor's apparatus, systems, and methods corresponding to step 4 of the flow chart.

Referring now to FIG. 8, a simplified schematic depiction illustrates an embodiment of a mirror of the inventor's apparatus, systems, and methods. This mirror embodiment is designated generally by the reference numeral 800. FIG. 8 depicts the inventor's apparatus, systems, and methods corresponding to step 4 of FIG. 1. Step 4 of FIG. 1 is the step of selectively pressuring certain of the microfluidic channels so that the mirror can be deformed to a desired shape.

The mirror embodiment 800 has been produce by the inventor's apparatus, systems, and methods shown in FIGS. 1-6. The mirror embodiment 800 has a concave shape that has been produced by actuation of the inventor's deformable mirror. The series of microchannels are individually addressable. A multitude of individual microchannels terminates in the vicinity of the mirror 800. The microchannels produce movement of the portion of the mirror 800 to produce the concave shape.

Figure 9:
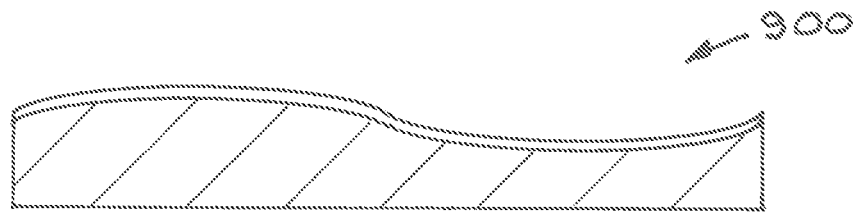
FIG. 9 is a simplified schematic depiction that illustrates the structural components of another embodiment of the inventor's apparatus, systems, and methods corresponding to step 4 of the flow chart.

Referring now to FIG. 9, a simplified schematic depiction illustrates an embodiment of a mirror of the inventor's apparatus, systems, and methods. This mirror embodiment is designated generally by the reference numeral 900. FIG. 9 depicts the inventor's apparatus, systems, and methods corresponding to step 4 of FIG. 1. Step 4 of FIG. 1 is the step of selectively pressuring certain of the microfluidic channels so that the mirror can be deformed to a desired shape.

The mirror embodiment 900 has been produce by the inventor's apparatus, systems, and methods shown in FIGS. 1-6. The mirror embodiment 900 has an asymmetric shape that has been produced by actuation of the inventor's deformable mirror. The series of microchannels are individually addressable. A multitude of individual microchannels terminates in the vicinity of the mirror 900. The microchannels produce movement of the portion of the mirror 900 to produce the asymmetric shape.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. A deformable mirror, comprising:
a thin film mirror, said thin film mirror having a mirror front face and a mirror back exposed surface;
an elastomeric support structure connected to said mirror back exposed surface;
said elastomeric support structure including a multitude of microchannels wherein said microchannels have a closed end located proximate said mirror back exposed surface and an open end located away from said mirror back exposed surface;
a fluid pressure source connected to said open end of said microchannels; and
a power source and control system connected to said fluid pressure source.

2. The deformable mirror of claim 1 wherein said microchannels are elastomeric.

3. The deformable mirror of claim 1 wherein said microchannels are flexible.

4. The deformable mirror of claim 1 wherein said fluid pressure source includes a piezoelectric crystal.

5. The deformable mirror of claim 1 wherein said fluid pressure source includes a valve.

6. The deformable mirror of claim 1 wherein said elastomeric support structure is an additive manufactured flow elastomeric support structure.

7. The deformable mirror of claim 1 wherein said mirror back exposed surface has areas that allow deformation of said thin film mirror and wherein said closed end of said microchannels are individually addressable to said areas that allow deformation of said thin film mirror.

8. The deformable mirror of claim 7 wherein said closed end of said microchannels that are individually addressable to said areas that allow deformation of said thin film mirror are positioned to provide said mirror front face with a convex shape.

9. The deformable mirror of claim 7 wherein said closed end of said microchannels that are individually addressable to said areas that allow deformation of said thin film mirror are positioned to provide said mirror front face with a concave shape.

10. The deformable mirror of claim 7 wherein said closed end of said microchannels that are individually addressable to said areas that allow deformation of said thin film mirror are positioned to provide said mirror front face with an asymmetrical shape.

11. A deformable mirror, comprising:
a thin film mirror, said thin film mirror having a mirror front face and a mirror back exposed surface;
additive manufactured elastomeric support structure means for causing said thin film mirror to be deformed to a desired shape connected to said mirror back exposed surface wherein said additive manufactured elastomeric support structure means for causing said thin film mirror to be deformed to a desired shape includes a multitude of microchannels wherein said microchannels have a closed end located proximate said mirror back exposed surface and an open end located away from said mirror back exposed surface;
fluid pressure source means for producing fluid pressure connected to said open end of said microchannels; and
power source and control means connected to said fluid pressure source for pressuring certain of said microfluidic channels causing said thin film mirror to be deformed to a desired shape.

12. The deformable mirror of claim 11 wherein said fluid pressure source means includes a piezoelectric crystal.

13. The deformable mirror of claim 11 wherein said fluid pressure source means includes a valve.

* * * * *